United States Patent [19]

Moore

[11] 4,219,115
[45] Aug. 26, 1980

[54] ACCUMULATION CONVEYOR BRAKE

[75] Inventor: Archie S. Moore, Kansas City, Mo.

[73] Assignee: Mid-West Conveyor Company, Inc., Kansas City, Kans.

[21] Appl. No.: 872,682

[22] Filed: Jan. 26, 1978

[51] Int. Cl.² .......................................... B65G 13/075
[52] U.S. Cl. .................................. 198/781; 193/35 A
[58] Field of Search .............. 198/781, 784; 193/35 A

[56] References Cited

U.S. PATENT DOCUMENTS

| | | |
|---|---|---|
| 1,900,150 | 3/1933 | Anderson . |
| 2,590,994 | 4/1952 | McKay ............................. 193/35 A |
| 3,219,172 | 11/1965 | Harrison ............................. 198/781 |
| 3,627,092 | 12/1971 | Fleischauer et al. |
| 3,724,642 | 4/1973 | DeGood ............................. 198/781 |
| 3,770,102 | 11/1973 | DeGood . |

FOREIGN PATENT DOCUMENTS

| | | |
|---|---|---|
| 1368085 | 9/1974 | United Kingdom ..................... 198/781 |
| 1500782 | 2/1978 | United Kingdom ..................... 198/781 |

OTHER PUBLICATIONS

Drawing of Pressure Frame; Mid-West Conveyor Company, Inc., Filed in paper #4.

Primary Examiner—Jeffrey J. Nase
Attorney, Agent, or Firm—Fishburn, Gold & Litman

[57] ABSTRACT

A brake mechanism for an accumulation conveyor includes a brake frame supporting a brake pad at an angle and movable between a lower braking position with the brake pad frictionally engaging one of the conveyor rollers on an upper non-braking position. Preferably, the brake frame includes pressure rollers for moving a roller driving belt into contact with the conveyor rollers in the non-braking position and out of contact with the rollers in the braking position. The brake frame includes ramp members engaging bearing rollers on the conveyor frame, and an extendible member is operable by actuation of a downstream signal roller to move the brake frame relative to the conveyor frame.

17 Claims, 4 Drawing Figures

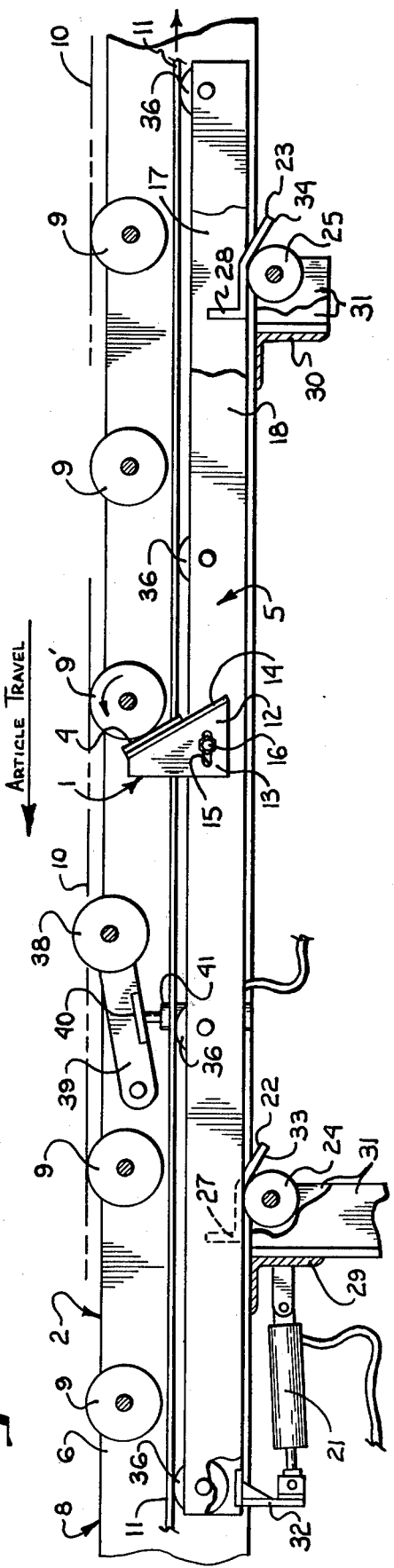
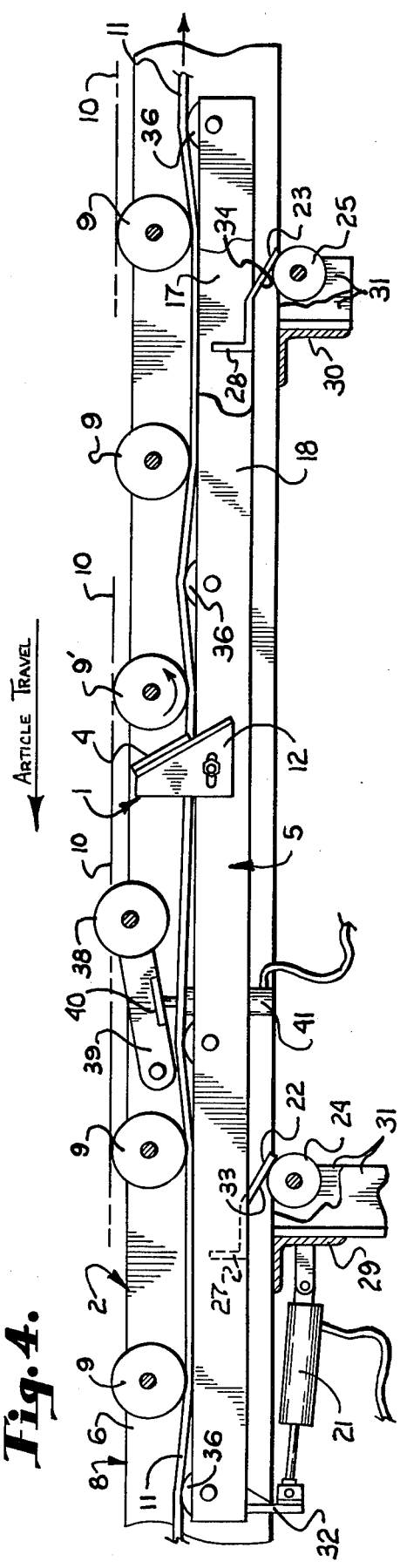

ACCUMULATION CONVEYOR BRAKE

The present invention relates to accumulation conveyors and more particularly to an improved brake mechanism for such a conveyor.

One of the purposes of accumulation conveyors is to stop articles thereon without disruption of the flow of articles immediately behind, or upstream of, the stopped article, such article stopping otherwise often being characterized by collisions among the articles, accumulated driving pressure and roller friction on the stopped articles, and excessive loading on the propelling equipment of the conveyor.

One typical approach in accumulation conveyors is the arrangement of accumulation zones of a given length determined by the length of the articles and the spacing required therebetween. Each zone includes a signaling member connected to a mechanism for disengaging the driving power from the rollers in the zone immediately upstream. Thus, when an article is stopped in a given zone, the zone immediately behind is deactivated thereby preventing an oncoming article from colliding with the stopped article.

In a great many live roller conveyors, power is applied to the rollers by means of an endless driven belt that is frictionally engaged with the lower surfaces of the rollers. Accumulation zones on this type of conveyor generally include a movable mechanism for lifting the belt into driving contact with the rollers in the absence of stopped articles downstream and for dropping the belt out of contact in response to a signal from downstream indicating the presence of a stopped article.

Because of the increased inertia of heavier articles, it has been found that disengaging the driving power from the rollers is not sufficient in itself to prevent a moving article from colliding with a stopped article immediately downstream. A positive braking action is required.

A common prior art accumulation conveyor brake is the type wherein a brake pad is applied in an upward direction to the lower surface of a roller such as the brake shown in FIG. 5 of U.S. Pat. No. 1,900,150 or in FIG. 8 of U.S. Pat. No. 3,770,102. When such a brake is combined with the power disengaging mechanism described above, two mechanisms are required for stopping an article. Since both mechanisms act on the rollers in an upward direction, it is necessary to disengage the brakes while the belt is driving the rollers, and it is necessary to disengage the belt before applying the brake.

In the brake mechanism of the present invention, the brake and belt engaging mechanisms are combined on a single movable frame. The brake is disengaged and the belt is lifted into driving contact with the rollers in the upper position of the frame; and the belt is disengaged and the brake engaged in the lower position.

The principal objects of the present invention are: to provide an improved brake mechanism for accumulating conveyors; to provide such a brake mechanism in combination with a mechanism for lifting a roller driving belt into and out of contact with the article carrying rollers of an accumulation zone; to provide such a brake mechanism wherein braking occurs at the lower position thereof and the brake is released in the upper position; to provide such a brake mechanism wherein a brake pad is applied at an angle to the downstream side of an article carrying roller whereby the frictional engagement of a moving article with the braked roller tends to increase the force of the brake pad on the roller; to provide such a brake mechanism wherein the brake frame is translated in an angular direction relative to horizontal; to provide such a brake mechanism which does not intrude into the article conveying surface; and to provide such a brake mechanism which is economical to manufacture, simple in configuration, durable and positive in operation, and which is particularly well adapted for its intended purpose.

Other objects and advantages of the present invention will become apparent from the following description taken in connection with the accompanying drawings wherein are set forth, by way of illustration and example, certain embodiments of this invention.

FIG. 3 is a further enlarged longitudinal sectional view taken on line 3.—3. of FIG. 2 and showing an accumulation zone with the brake pad engaging an article carrying roller and with the driving belt disengaged.

FIG. 4 is a view similar to FIG. 3 showing the driving belt engaging the article carrying rollers and with the brake disengaged.

Figure 1:
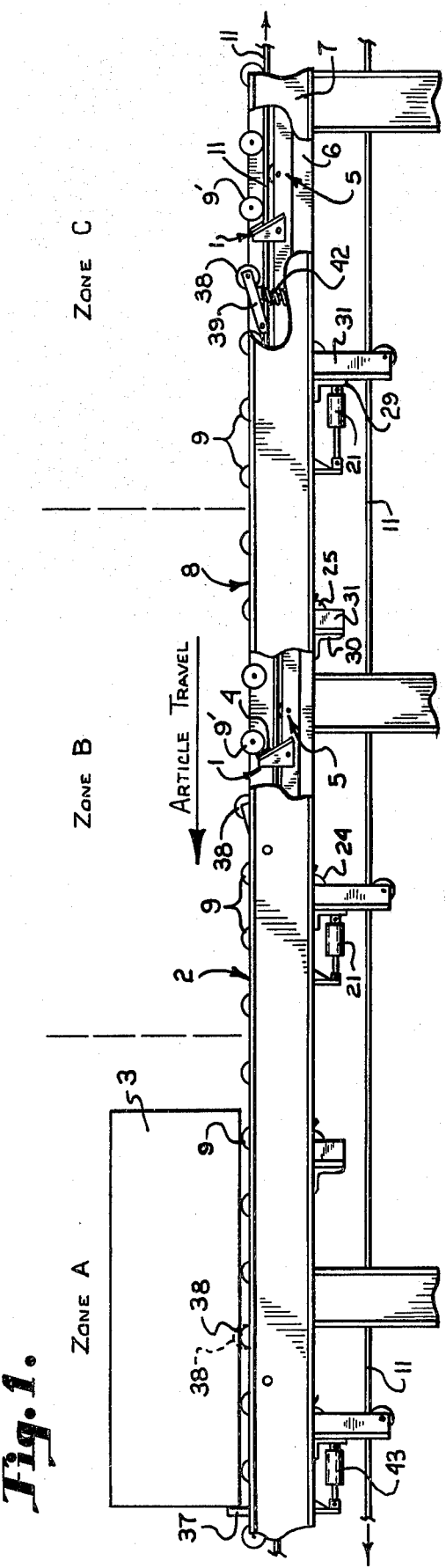
FIG. 1 is a side elevational view of an accumulation conveyor employing the brake mechanism and showing three accumulation zones, with portions broken away to illustrate cooperation between the signal rollers and the brake mechanism.

Referring to the drawings in more detail:

The reference numeral 1 generally designates a brake mechanism for use on an accumulation conveyor 2 for the purpose of stopping articles 3 traveling thereon to prevent collisions between moving articles and stopping articles. The brake mechanism 1 generally comprises a brake pad 4 supported on a brake frame 5 which is movable between a lower braking position and an upper non-braking position.

The accumulation conveyor 2 is a typical roller conveyor having a pair of side members of channels 6 and 7 joined together in parallel, spaced apart relation to define a conveyor frame 8. A plurality of article carrying rollers 9 is mounted between side members 6 and 7 and spaced longitudinally along the conveyor frame 8. The article carrying rollers 9 are positioned slightly above the top surface of the conveyor frame and define an article conveying or supporting surface 10 (see FIG. 3). The conveyor 2 receives articles from an upstream direction, from the right as viewed in FIG. 1, and conveys the articles in a downstream direction, to the left in FIG. 1.

While the brake mechanism 1 is primarily intended for powered or live roller conveyors, its use is not to be limited thereto. With suitable modifications, the brake mechanism 1 could find practical application in non-powered types of roller conveyors, such as gravity conveyors. In the live roller conveyor 2 illustrated, the article carrying rollers 9 are driven by an endless driving member or belt 11 positioned for frictional contact with the lower surface of the article carrying rollers 9 and powered by conventional means (not shown).

Figure 2:
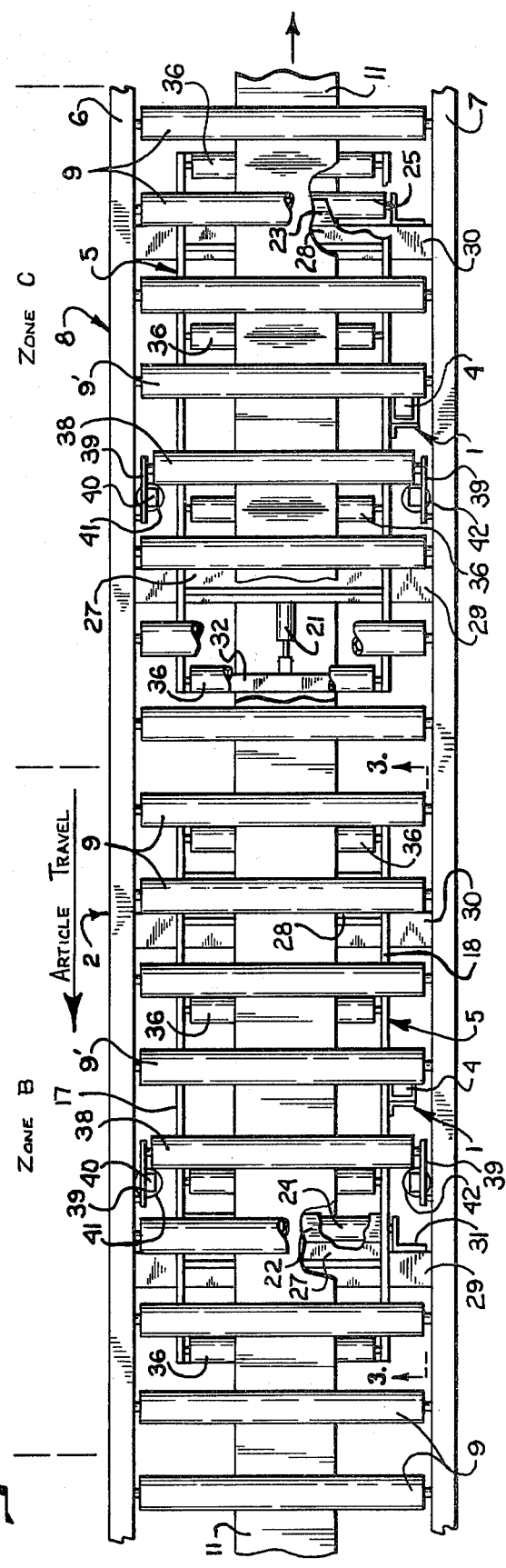
FIG. 2 is a somewhat enlarged top plan view of the accumulation conveyor showing the second and third accumulation zones of FIG. 1 in greater detail and with portions broken away.

With reference to FIG. 3, the brake pad 4 is shown in the braking position in frictional contact with one of the article carrying rollers, below its axis designated as a brake roller 9'. In the illustrated brake mechanism 1 the brake pad 4 is mounted on a bracket 12 which is supported by the brake frame 5. Preferably, the brake pad is formed of a conventional brake lining material, such as molded asbestos. The bracket 12 may take any suitable form and is illustrated as a piece of angle stock or sheet stock suitably formed with a mounting leg 13 and a brake pad supporting leg 14. The bracket 12 may be mounted on the brake frame 5 in any convenient manner and, as illustrated, the mounting leg 13 includes an elongated slot 15 for receiving a bolt 16 passing therethrough and through one of the side rails 17 and 18 of the brake frame 5. The slot 15 provides for adjustment of the bracket 12 for optimum positioning the brake pad. As illustrated in FIG. 2, each brake frame 5 includes a single brake pad 4 engaging a single roller; however, where required the brake frame 5 may include as many brake pads as needed for effective braking. The brake pad supporting bracket 12 may be mounted at any convenient location on the brake frame 5 depending upon the relative location of the brake roller 9'. FIG. 4 illustrates the brake pad in the upper or non-braking position. The bracket 12 has been shifted upward and to the left from the position illustrated in FIG. 3., that is, in an angular direction with respect to horizontal.

The brake mechanism 1 includes motor means connected to the brake frame 5 and the conveyor frame 8 and operable to translate the brake frame 5 between the lower braking position and the upper non-braking position. The motor means is most conveniently some type of extendible member, and in the illustrated embodiment is a pneumatic cylinder 21, preferably, a single action, spring return air cylinder. Cylinder 21 could be rigidly connected to the brake frame and conveyor frame, in order to describe the desired translation. However, a more workable arrangement comprises pivotally connecting the cylinder 21 to the brake frame 5 and the conveyor frame 8 and employing some form of cam means in cooperation with cam followers for guiding the brake frame 5 through the required excursion. In the illustrated brake mechanism, the cam means are ramp members 22 and 23 mounted on the brake frame 5 and engaging respectively the followers or bearing rollers 24 and 25 mounted on the conveyor frame 8. It is conceivable that the ramp members could be mounted on the conveyor frame 8 and the bearing rollers on the brake frame 5. Further, the cam means could comprise angled slots on either the brake frame or the conveyor frame with followers of some type riding in the slots.

The illustrated brake frame 5 includes a pair of side rails or members 17 and 18 joined together in spaced apart, parallel relation and disposed below the article carrying rollers 9. The side rails 17 and 18 are joined together by transverse members 27 and 28 positioned at longitudinally spaced locations. The ramp members 22 and 23 may be integral respectively with the transverse members 27 and 28. The conveyor frame 8 includes cross beams 29 and 30 attached to the lower edges of the conveyor frame side members 6 and 7 and extending therebetween. The cross beams 29 and 30 include members such as vertically positioned angles 31 attached thereto and supporting the bearing rollers 24 and 25. The brake frame 5 includes a cylinder mounting bracket 32 having one end of the air cylinder 21 pivotally connected thereto, with the other end of the cylinder 21 pivotally connected to one of the cross beams 29 or 30. Preferably, the air cylinder 21 is mounted for action in a generally longitudinal direction of the conveyor frame 8 for space saving. The ramp members 22 and 23 include downwardly facing inclined surfaces, respectively 33 and 34, engaging the bearing rollers 24 and 25.

When the cylinder 21 is extended, the brake frame 5 tends to move in a downstream direction. However, because of engagement between the ramp members 22 and 23 with respective bearing rollers 24 and 25, the direction of movement of the brake frame 5 is diverted to an angular upward direction, with the cylinder 21 pivoting somewhat to maintain connection between the brake frame 5 and the conveyor frame 8. As the brake frame 5 moves upwardly and in a downstream direction, the brake pad 4 moves out of contact with the brake roller 9' thereby releasing the roller to turn freely. When the cylinder 21 is retracted, the brake frame 5 returns to the braking position with the brake pad 4 contacting the brake roller 9'.

The brake pad 4 is illustrated as being applied to the downstream side of the roller 9'. This is necessary since if the brake pad 4 were applied to the upstream side of the roller 9' and the ramp, bearing rollers, and the air cylinder were reversed accordingly, the braking action of the brake pad 4 would be greatly less effective. Frictional contact between the roller 9' and a heavy article traveling thereover and between the roller 9' and the brake pad 4 applied to the upstream side thereof would tend to continually cause the brake frame to be lifted, thereby diminishing frictional contact between the roller 9' and the brake pad 4. However, with the brake pad applied to the downstream side of the roller 9', as illustrated, the continued rotation of the roller 9' urges the brake pad downward and in the upstream direction which increases the force of the brake pad 4 on the roller 9' and thereby increases the frictional contact therebetween.

As illustrated, the brake pad 4 is supported at an angle relative to horizontal. The angle at which the brake pad is oriented must be greater than that of the ramp members relative to horizontal. If the angles are equal, no effective braking action is possible. If the brake pad is at an angle less than that of the ramp members, the brake pad is applied in the upper position of the brake frame 5. In the preferred embodiment of the present invention, it is desirable for the brake pad 4 to be applied to the roller 9' in the lower position of the brake frame 5. As the angular difference between the brake pad and the ramps increases, the displacement of the brake frame needed to separate the brake pad from the roller 9' decreases. However, a point is reached at which the brake pad supporting bracket 12 begins to intrude into the conveying surface 10. Therefore, the optimum angle of the brake pad 4 is a compromise determined by consideration of the angle of the ramps 22 and 23, the vertical dimensions of the conveyor frame 8 and the bracket 12, and other factors. The slot 15 in the brake pad bracket 12 allows some tolerance in selecting the angle of the brake pad 4.

The conveyor 2 is a live roller conveyor; therefore, some means must be provided for effecting engagement and disengagement between the belt 11 and the article carrying rollers 9. A separate mechanism from the brake mechanism 1 could be employed for lifting the belt; however, since the brake pad 4 of the brake mechanism 1 is applied in the lower position of the brake frame 5 and is released in the upper position thereof, the brake frame 5 provides a convenient support for a belt engagement mechanism.

Referring to FIGS. 3 and 4, the brake frame 5 includes pressure rollers 36 spaced therealong. In the upper, nonbraking position of the brake frame 5, the pressure rollers 36 press the belt into driving contact with the rollers 9 and the brake rollers 9'. In the lower, braking position of the brake frame 5, the pressure rollers 36 are lowered and the belt 11 is likewise lowered from contact with the rollers. Without the pressure rollers on the brake frame 5, the precise orientation of the frame is not critical. Therefore, the brake mechanism 1 would be operative with a single ramp member and a single bearing roller. However, with the inclusion of the pressure rollers 36 on the brake frame 5, it is necessary to maintain the brake frame 5 in a substantially horizontal orientation so that all of the pressure rollers 36 apply roughly equal pressure to the belt 11. Therefore, the brake frame 5 requires at least two ramps 22 and 23 and two bearing rollers 24 and 25.

It is conventional practice to divide accumulation conveyors into accumulating zones, with each zone providing space and means for stopping an article entering a particular zone if the succeeding zone has an article stopped therein. The accumulation conveyor 2, illustrated in FIG. 1, has been divided into three accumulating zones, designated as Zone A, Zone B, and Zone C. An article 3 is shown stopped in Zone A by the deployment of a stop member 37. Therefore, it is necessary to disengage the driving belt 11 from the rollers 9 in the Zone B and to apply the brake mechanism 1 to the roller 9' in Zone B in order to prevent an article entering Zone B from colliding with the article 3 stopped in Zone A.

In order to signal each accumulating zone that the succeeding zone has an article stopped therein, the conveyor 2 includes signalling means in each zone connected to the cylinder 21 in the preceding zone for the purpose of effecting disengagement of the pressure rollers 36 and application of the brake pad 4 to the brake roller 9' in that zone. As illustrated, the signalling means comprises signal rollers 38 disposed for engagement by an article entering a particular zone. The signal rollers 38 are mounted on levers 39 pivotally attached to the conveyor frame side members 6 and 7. One of the levers 39 includes an inwardly projecting tab 40 adapted for engaging a switch means, in this case a pneumatic valve 41, connected with and controlling the air cylinder 21 in the preceding or upstream accumulation zone. The signal roller 38 is positioned slightly above the conveying surface 10 whereby an article being conveyed thereover engages the signal roller 38 thereby lowering same and actuating the pneumatic valve 41. A resilient member or spring is connected between the conveyor frame 8 and one or both of the signal roller levers 39 and urges the signal roller 38 into a position slightly above the conveying surface 10. In FIG. 1, the resilient member is represented by a coil spring 42 mounted on the conveyor side member 7 and contacting one of the levers 39. Alternatively, the pneumatic valve 41 may include a spring (not shown) therein for urging the signal roller into the proper position.

Summarizing the operation of the brake mechanism 1: with reference to FIG. 1, an article 3 enters Zone A and is stopped by a stop member 37. Pneumatic connections would be provided whereby when the stop 37 is deployed, an air cylinder 43 in Zone A is actuated to disengage the driving belt 11 from the rollers 9 in Zone A. As the article 3 enters Zone A, the signal roller 38 therein is engaged and lowered, thereby actuating a pneumatic valve in Zone A which is connected to the air cylinder 21 in Zone B. The brake frames 5 are held in the upper, non-braking position in the extended positions of the air cylinders 21. When the signal roller 38 in Zone A is engaged, the air pressure connected to the air cylinder 21 in Zone B is cut off; therefore, the resilient member (not shown) in the spring return cylinder 21 urges the brake frame 5 to the lower, braking position whereby the brake pad 4 is applied to the brake roller 9' in Zone B and the pressure rollers 36 on the brake frame 5 release the belt 11 from the article carrying rollers 9 in Zone B. Therefore, an article 3 entering Zone B would be prevented from colliding with the article in Zone A by frictional contact of the article in Zone B with the brake roller 9' and by the lack of driving power on the rollers 9 in Zone B. The article in Zone B engages the signal roller 38 therein which causes deactivation of the rollers 9 and applies the brake pad 4 to the brake roller 9' in Zone C. The sequence continues in additional accumulation zones upstream of Zone C.

When the stop 37 is removed from the path of the article 3 in Zone A, the cylinder 43 therein is actuated to reactivate the rollers 9 therein. As soon as the article 3 passes and releases the signal roller 38 in Zone A, the cylinder 21 in Zone B is actuated to lift the brake frame 5 therein and thereby reactivate the rollers 9 and release the brake pad 4 from the brake roller 9' in Zone B. As the article in Zone B clears the signal roller 38 therein, Zone C is reactivated and the cycle continues in a similar fashion in additional upstream zones.

While certain forms of the present invention have been described and illustrated, it is not to be limited thereto except insofar as such limitations are included in the following claims.

What is claimed and desired to secure by Letters Patent is:

1. An accumulation roller conveyor having a brake mechanism, said conveyor including an elongated conveyor frame with article carrying rollers positioned thereon to define an article conveying surface, said conveyor receiving articles from an upstream direction and conveying same in a downstream direction, said brake mechanism comprising:
   (a) a brake frame disposed below said article carrying rollers and movable in an inclined direction generally upward to a non-braking position and generally downward to a braking position;
   (b) a brake pad supported on said brake frame below said article conveying surface and frictionally engaging only one of said article carrying rollers below its axis in said braking position; and
   (c) motor means operatively connected to said conveyor frame and to said brake frame and operable to translate said brake frame between said braking position and said non-braking position.

2. An accumulation roller conveyor as set forth in claim 1 including:
   (a) cam means on one of said brake frame and said conveyor frame; and
   (b) a follower on the other of said brake frame and said conveyor frame and engaging said cam means.

3. An accumulation roller conveyor as set forth in claim 2 wherein:
   (a) said cam means is a ramp member; and
   (b) said follower is a bearing roller.

4. An accumulation roller conveyor as set forth in claim 3 wherein:
   (a) said ramp member is operatively positioned on said brake frame and includes a generally downwardly facing inclined surface; and (b) said bearing roller is supported on said conveyor frame and has said ramp member inclined surface engaged therewith.

5. An accumulation roller conveyor as set forth in claim 1 wherein said motor means is an extendible member.

6. An accumulation roller conveyor as set forth in claim 5 wherein said extendible member is positioned to act in a generally longitudinal direction of said conveyor.

7. An accumulation roller conveyor as set forth in claim 1 wherein:
(a) said conveyor includes signalling means positioned downstream of said brake mechanism; and
(b) said signalling means is operatively connected to said motor means to effect translating said brake frame to said braking position in response to an article on said article conveying surface engaging said signalling means and to effect translating said brake frame to said non-braking position in response to disengagement of said article from said signalling means.

8. An accumulation roller conveyor as set forth in claim 1 wherein said signalling means comprises:
(a) a signal roller mounted on said conveyor frame downstream of said brake mechanism and movable upon engagement thereof by an article moving downstream on said article conveying surface; and
(b) switch means communicating with said motor means and actuated by movement of said signal roller to effect said translation of said brake frame.

9. An accumulation roller conveyor as set forth in claim 8 wherein said signal roller includes:
(a) a lever rotatably mounted on each end of said signal roller, each lever having one end pivotally connected to said conveyor frame;
(b) one lever, upon movement thereof, engaging said switch means; and
(c) a resilient member associated with said signal roller and urging same into a position engageable by an article moving downstream thereover.

10. An accumulation roller conveyor as set forth in claim 9 wherein:
(a) said motor means is an air cylinder; and
(b) said switch means is a pneumatic valve.

11. An accumulation roller conveyor as set forth in claim 1 wherein:
(a) said accumulation conveyor is a live roller conveyor with an endless driving member positioned below said article carrying rollers and movable between an article propelling position in driving contact with said article carrying rollers and a non-article propelling position; and
(b) said brake frame includes pressure means thereon which urge said driving member into said article propelling position in said brake frame non-braking position and which release said driving member to assume said non-article propelling position in said brake frame braking position.

12. An accumulation roller conveyor as set forth in claim 1 wherein said brake frame includes:
(a) a pair of elongated, spaced apart parallel side rails; and
(b) a plurality of longitudinally spaced pressure rollers extending between said rails and comprising said pressure means.

13. An accumulation roller conveyor as set forth in claim 11 including means maintaining said brake frame substantially horizontal throughout said translation, in said braking position and in said non-braking position.

14. An accumulation roller conveyor as set forth in claim 13 wherein said means maintaining said brake frame substantially horizontal includes:
(a) at least two spaced apart cam means on one of said brake frame and said conveyor frame; and
(b) at least two spaced apart followers on the other of said brake frame and said conveyor frame, each follower being positioned to engage a respective one of said cam means.

15. An accumulation roller conveyor as set forth in claim 14 wherein:
(a) each of said cam means is a ramp member on said brake frame and has a downwardly facing inclined surface; and
(b) each of said followers is a bearing roller mounted on said conveyor frame and has a ramp member inclined surface engaged therewith.

16. An accumulation roller conveyor as set forth in claim 1 wherein:
(a) one of said brake frame and conveyor frame includes ramp means having a ramp surface positioned at a ramp angle with respect to horizontal;
(b) the other of said brake and conveyor frames includes a follower engaged with said ramp surface;
(c) said brake is positioned at a brake pad angle with respect to horizontal; and
(d) said brake pad angle is greater than said ramp angle.

17. In an accumulation conveyor having an elongated conveyor frame with conveyor rollers defining an article conveying surface and a brake mechanism, and having an endless driving member positioned below said rollers and movable into article propelling contact with said rollers, the improvement comprising:
(a) a combination pressure and brake frame disposed below said conveyor rollers and movable in an inclined direction upward to an article propelling position and in an inclined direction downward to an article braking position;
(b) at least one pressure roller journalled on said combination frame to urge said driving member into propelling contact with said conveyor rollers in said article propelling position and to release said driving member from said propelling contact in said article braking position;
(c) at least one brake pad supported on said combination frame for frictional engagement with only one of said conveyor rollers below its axis in said article braking position; and
(d) motor means connected to said conveyor frame and said combination frame and operable to translate said combination frame between said article propelling and braking positions thereof.

* * * * *